US012755956B2

(12) United States Patent
Kubo et al.

(10) Patent No.: US 12,755,956 B2
(45) **Date of Patent: *Oct. 6, 2026**

(54) LEAD SULFATE FILM REMOVING APPARATUS, METHOD, AND SYSTEM

(71) Applicants: ALPHA BRIGHT COMPANY LIMITED, Niigata (JP); POWER SUPPORT COMPANY LIMITED, Tokyo (JP)

(72) Inventors: Takashi Kubo, Tokyo (JP); Katsushi Igarashi, Tokyo (JP)

(73) Assignees: ALPHA BRIGHT COMPANY LIMITED, Niigata (JP); Power Support Co., Ltd, Tokyo (JP)

( * ) Notice: Subject to any disclaimer, the term of this patent is extended or adjusted under 35 U.S.C. 154(b) by 85 days.

This patent is subject to a terminal disclaimer.

(21) Appl. No.: 18/024,768

(22) PCT Filed: Feb. 6, 2023

(86) PCT No.: PCT/JP2023/003821

§ 371 (c)(1), (2) Date: Mar. 5, 2023

(87) PCT Pub. No.: WO2023/149578

PCT Pub. Date: Aug. 10, 2023

(65) Prior Publication Data

US 2024/0282907 A1 Aug. 22, 2024

(30) Foreign Application Priority Data

Feb. 7, 2022 (JP) ................................ 2020-017482

(51) Int. Cl.
*H01M 4/04* (2006.01)
*H01M 4/16* (2006.01)

(52) U.S. Cl.
CPC .......... *H01M 4/0447* (2013.01); *H01M 4/16* (2013.01)

(58) Field of Classification Search
CPC ...... H01M 10/54; H01M 10/06; H01M 10/12; H01M 10/128; H01M 4/0447; H01M 4/16; H01M 4/22; H01M 4/23
See application file for complete search history.

(56) References Cited

U.S. PATENT DOCUMENTS

| | | | | |
|---|---|---|---|---|
| 2013/0141053 A1* | 6/2013 | Kondo | ................. | H01M 10/44 320/141 |
| 2025/0343282 A1* | 11/2025 | Kubo | ................... | H01M 10/06 |

FOREIGN PATENT DOCUMENTS

| | | |
|---|---|---|
| CN | 103069640 A | 4/2013 |
| CN | 103384929 A | 11/2013 |

(Continued)

OTHER PUBLICATIONS

International Search Report issued on Apr. 18, 2023.
Search Report for TW112103883, Issued on Apr. 20, 2026, Total of 3 pages.

*Primary Examiner* — Christopher P Domone
(74) *Attorney, Agent, or Firm* — Apex Juris, pllc; Tracy M Heims

(57) ABSTRACT

To provide a lead sulfate film removing apparatus that has low power consumption and does not damage an electrode of a lead-acid battery. A lead sulfate film removing apparatus for removing a lead sulfate film generated on an electrode of a lead-acid battery includes a generation unit that generates a removal signal of the lead sulfate film having a peak value of 550 mA to 750 mA, a pulse width of 5 nsec to 100 nsec, and a frequency of 5 kHz to 50 kHz, based on a signal extracted from the lead-acid battery, and a supply unit that supplies the removal signal generated by the generation unit to the electrode of the lead-acid battery.

3 Claims, 2 Drawing Sheets

(56) References Cited

FOREIGN PATENT DOCUMENTS

| | | | |
|---|---|---|---|
| JP | 2006032065 | A | 2/2006 |
| JP | 2006164540 | A | 6/2006 |
| JP | 2012-48886 | | 3/2012 |
| KR | 20150139369 | A | 12/2015 |
| TW | 201642514 | A | 12/2016 |

* cited by examiner

| | LEAD-ACID BATTERY VOLTAGE VALUE (V) | PEAK CURRENT VALUE (mA) |
|---|---|---|
| LEAD-ACID BATTERY A | 12.9 | 570 |
| LEAD-ACID BATTERY B | 13.9 | 600 |

| | LEAD-ACID BATTERY VOLTAGE VALUE (V) | PEAK CURRENT VALUE (mA) |
|---|---|---|
| LEAD-ACID BATTERY C | 25.8 | 610 |
| LEAD-ACID BATTERY D | 27.8 | 660 |

FIG. 3

| | MEASUREMENT CONTENT | BEFORE RECOVERY | AFTER RECOVERY |
|---|---|---|---|
| FORKLIFT a | VOLTAGE VALUE (V) | 2.16 | 2.14 |
| | SPECIFIC GRAVITY VALUE | 1.01 | 1.31 |
| | SPECIFIC GRAVITY VALUE DEVIATION | 1.25 | 0.02 |
| FORKLIFT b | VOLTAGE VALUE (V) | 2.14 | 2.14 |
| | SPECIFIC GRAVITY VALUE | 1.30 | 1.29 |
| | SPECIFIC GRAVITY VALUE DEVIATION | 0.03 | 0.01 |
| GOLF CART c | VOLTAGE VALUE (V) | 12.65 | 12.51 |
| | INTERNAL RESISTANCE VALUE (mΩ) | 12.50 | 6.14 |
| | RESISTANCE DIFFERENCE (mΩ) | 10.76 | 0.69 |
| GOLF CART d | VOLTAGE VALUE (V) | 11.85 | 12.72 |
| | INTERNAL RESISTANCE VALUE (Ω) | 8.78 | 6.10 |
| | RESISTANCE DIFFERENCE (mΩ) | 1.47 | 1.35 |
| AUTOMOBILE e | VOLTAGE VALUE (V) | 12.61 | 12.72 |
| | CCA VALUE | 171 | 297 |
| | INTERNAL RESISTANCE VALUE (mΩ) | 14.35 | 8.28 |
| AUTOMOBILE f | VOLTAGE VALUE (V) | 12.19 | 12.39 |
| | CCA VALUE | 402 | 458 |
| | INTERNAL RESISTANCE VALUE (mΩ) | 7.65 | 6.32 |
| DISASTER PREVENTION RADIO g | VOLTAGE VALUE (V) | 13.46 | 13.44 |
| | INTERNAL RESISTANCE VALUE (mΩ) | 9.26 | 8.54 |
| DISASTER PREVENTION RADIO h | VOLTAGE VALUE (V) | 13.56 | 13.47 |
| | INTERNAL RESISTANCE VALUE (mΩ) | 9.31 | 8.55 |

LEAD SULFATE FILM REMOVING APPARATUS, METHOD, AND SYSTEM

BACKGROUND OF THE INVENTION

1. Technical Field

The present invention relates to a lead sulfate film removing apparatus, a method, and a system, and particularly relates to a lead sulfate film removing apparatus, a method, and a system for removing a lead sulfate film generated at a negative electrode of a lead-acid battery.

2. Description of the Related Art

Patent Literature 1 discloses a lead sulfate film removing apparatus for reducing the time required for removing a lead sulfate film while suppressing heat generation at the time of removing the lead sulfate film generated in a positive electrode and a negative electrode of a lead-acid battery. In this lead sulfate film removing apparatus, a switching circuit is driven using a pulse waveform drive signal having a pulse width of 1.6 μsec (16,000 nsec) and a frequency of 20,000 Hz. When the switching circuit is turned on, a current of 500 mA is taken out from a battery (lead-acid battery) via a resistor R1. When the switching circuit is turned off, taking out of the current is stopped. When the switching circuit is turned off, a counter electromotive force and a negative spike-like reverse current of 500 mA are supplied to the lead-acid battery. By this current acting on the electrode of the lead-acid battery, the lead sulfate film deposited on the electrode of the lead-acid battery is removed.

CITATION LIST

Patent Literature

Patent Literature 1: JP 2012-48886 A

SUMMARY OF THE INVENTION

Problem to be Resolved by the Invention

However, the lead sulfate film removing apparatus disclosed in Patent Literature 1 has relatively high power consumption, and in order to achieve the energy goal listed in the sustainable development goals (SDGs), it is required to reduce the power consumption.

In addition, in the lead sulfate film removing apparatus disclosed in Patent Literature 1, the current amount or level of the reverse current supplied to the electrode of the lead-acid battery is relatively excessive or high, and the electrode of the lead-acid battery is damaged. By using the lead sulfate film removing apparatus disclosed in Patent Literature 1, the life of the lead-acid battery is shortened, which is a complete reversal.

Therefore, an object of the present invention is to provide a lead sulfate film removing apparatus and method that have low power consumption and do not damage an electrode of a lead-acid battery.

In addition, it is convenient for an administrator or the like of an apparatus including the lead-acid battery to know an indication of replacement of the lead-acid battery, particularly when the lead-acid battery and the administrator or the like are located remotely. Therefore, an object of the present invention is to provide a lead sulfate film removing system capable of doing so.

In order to solve the above problems, the present inventors have conducted earnest studies on a removal signal for removing a lead sulfate film generated on an electrode of a lead-acid battery. As a result, it has been found that as a peak value of the removal signal is relatively large, a pulse width of the removal signal is relatively wide, and a frequency of the removal signal is relatively high, such a removal signal contributes to the removal of the lead sulfate film. On the other hand, as the peak value of the removal signal is relatively small, as the pulse width of the removal signal is relatively narrow, and as the frequency of the removal signal is relatively low, such a removal signal contributes to lower power consumption. By adjusting these in a well-balanced manner, power consumption of the lead sulfate film removing apparatus can be reduced, and damage given to the electrode of the lead-acid battery can be reduced.

Specifically, a lead sulfate film removing apparatus for removing a lead sulfate film generated on an electrode of a lead-acid battery includes:

- a generation unit that generates a removal signal of the lead sulfate film having a peak value of 550 mA to 750 mA, a pulse width of 5 nsec to 100 nsec, and a frequency of 5 kHz to 50 kHz, based on a signal extracted from the lead-acid battery; and
- a supply unit that supplies the removal signal generated by the generation unit to the electrode of the lead-acid battery.

The present invention also provides a lead sulfate film removing method for removing a lead sulfate film generated on an electrode of a lead-acid battery, the method including:

- a step of generating a removal signal of the lead sulfate film having a peak value of 550 mA to 750 mA, a pulse width of 5 nsec to 100 nsec, and a frequency of 5 kHz to 50 kHz, based on a signal extracted from the lead-acid battery; and
- a step of supplying the generated removal signal to the electrode of the lead-acid battery.

Here, for example, in a case where the conditions of the pulse width and the frequency are set to the above ranges and the peak value is set to 550 mA to 750 mA, it is confirmed that good results are obtained. Specifically, a removal amount of the lead sulfate film exceeds an amount of the lead sulfate film generated on a lead-acid battery negative electrode terminal, and the lead sulfate film can be effectively removed whereas no damage is found in the lead-acid battery electrode.

Similarly, it is confirmed that a good result is obtained even when the conditions of the frequency and the peak value are set to the above ranges and the pulse width is set to 5 nsec to 100 nsec. Also in this case, the removal amount of the lead sulfate film exceeds the amount of the lead sulfate film generated on the lead-acid battery negative electrode terminal, and the lead sulfate film can be effectively removed whereas no damage is found in the lead-acid battery electrode.

Furthermore, it is confirmed that a good result is obtained even when the conditions of the pulse width and the peak value are set to the above ranges and the frequency is set to 5 kHz to 50 kHz. Also in this case, the removal amount of the lead sulfate film exceeds the amount of the lead sulfate film generated on the lead-acid battery negative electrode terminal, and the lead sulfate film can be effectively removed whereas no damage is found in the lead-acid battery electrode.

Therefore, the present invention can provide a lead sulfate film removing apparatus that has low power consumption and does not damage the electrode of the lead-acid battery by optimizing the peak value, pulse width, and frequency of the removal signal.

In addition, the lead sulfate film removing apparatus of the present invention also has a secondary effect of downsizing the apparatus. The size of the product sold by the patentee of Patent Literature 1 is about 11 cm×about 5.5 cm×about 2 cm on a housing base, but this can be reduced to about 6 cm×about 3 cm×about 1.5 cm.

Furthermore, the lead sulfate film removing apparatus of the present invention can achieve a lead sulfate film removing apparatus that significantly exceeds the effect of suppressing a temperature rise, which is a problem of Patent Literature 1, by achieving low power consumption.

Furthermore, a lead sulfate film removing system of the present invention includes: the lead sulfate film removing apparatus;

a measurement device that performs measurement indicating performance of a lead-acid battery to which the lead sulfate film removing apparatus is connected; and a transmission device that transmits a measurement result measured by the measurement device.

According to the lead sulfate film removing system of the present invention, in addition to removing a lead sulfate film generated in a lead-acid battery of a communication base station used in a mountain area or the like, for example, it is possible to transmit a measurement result serving as a determination material for an indication of replacement of a lead-acid battery to an administrator in a remote location.

BRIEF DESCRIPTION OF THE DRAWINGS

FIG. 3 is a diagram showing measurement results of voltage values and the like before and after recovery by a lead sulfate film removing apparatus for a lead-acid battery mounted on a vehicle or the like.

REFERENCE SIGNS LIST

Figures 1, 2:
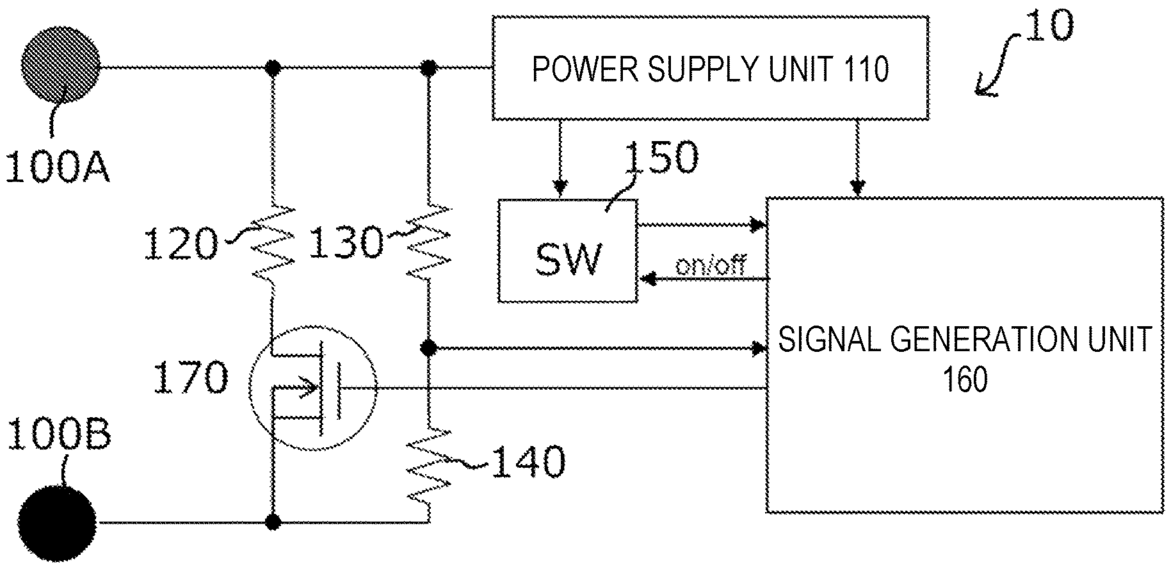
FIG. 1 is a block diagram partially functionally showing a circuit configuration of a lead sulfate film removing apparatus according to an embodiment of the present invention.
FIG. 2 is a diagram showing measurement results of a current value measured in a state where a substrate positive electrode terminal and a substrate negative electrode terminal shown in FIG. 1 are connected to a lead-acid battery positive electrode terminal and a lead-acid battery negative electrode terminal by a connection line that is not shown.

10 lead sulfate film removing apparatus
100A substrate positive electrode terminal
100B substrate negative electrode terminal
110 power supply unit
120 drive resistor
130, 140 voltage dividing resistor
150 switching circuit
160 signal generation unit
170 pulse driver

DETAILED DESCRIPTION

Hereinafter, a lead sulfate film removing apparatus, a method, and a system according to an embodiment of the present invention will be described with reference to the drawings.

FIG. 1 is a block diagram partially functionally showing a circuit configuration of the lead sulfate film removing apparatus according to the embodiment of the present invention. A lead sulfate film removing apparatus 10 includes a substrate positive electrode terminal 100A, a substrate negative electrode terminal 100B, a power supply unit 110, a drive resistor 120, voltage dividing resistors 130 and 140, a switching circuit 150, a signal generation unit 160, and a pulse driver 170, which will be described below.

The substrate positive electrode terminal 100A and the substrate negative electrode terminal 100B are electrically connected to a lead-acid battery positive electrode terminal and a lead-acid battery negative electrode terminal of a lead-acid battery that is not shown, respectively, through connection lines that are not shown. The substrate positive electrode terminal 100A is connected in parallel to the drive resistor 120, the voltage dividing resistors 130 and 140, and the power supply unit 110.

A part of the current (signal extracted from the lead-acid battery) flowing through the substrate positive electrode terminal 100A flows toward the pulse driver 170 located downstream thereof through the drive resistor 120. Further, a part of the current flows toward the signal generation unit 160 through the voltage dividing resistor 130 of the voltage dividing resistors 130 and 140. The rest of the current flows toward the power supply unit 110.

The power supply unit 110 includes, for example, a preceding-stage power supply circuit having a relatively high voltage and a subsequent-stage power supply circuit having a relatively low voltage, which are connected in series. Therefore, a relatively high output voltage VH of the preceding-stage power supply circuit generated using the lead-acid battery as a power supply is indirectly applied to the signal generation unit 160 via the switching circuit 150, and a relatively low output voltage VL of the subsequent-stage power supply circuit is directly applied to the signal generation unit 160. Of course, physically, one power supply circuit may be divided to obtain the output voltage VH and the output voltage VL.

The drive resistor 120 defines a value of the current flowing through the pulse driver 170. A resistance value of the drive resistor 120 may be determined according to a voltage value of the lead-acid battery, resistance values of the voltage dividing resistors 130 and 140, an input resistance value of the power supply unit 110, and the like, but can be set to about 10Ω to 30Ω (for example, about 15Ω) when these values are set as conditions to be described later.

The voltage dividing resistors 130 and 140 define a value of the current flowing toward the signal generation unit 160. Each resistance value of the voltage dividing resistors 130 and 140 may be determined according to the voltage value of the lead-acid battery, the resistance value of the drive resistor 120, the input resistance value of the power supply unit 110, and the like, but the resistance value of the voltage dividing resistor 130 can be set to about 0Ω to 20 kΩ (for example, about 0Ω), and the resistance value of the voltage dividing resistor 140 can be set to about 100Ω to 300 kΩ (about 200 kΩ).

In this example, the switching circuit 150 is achieved by a transistor such as an FET, and executes a switching operation according to an on/off signal to be described later output from the signal generation unit 160. When the switching circuit 150 is in an on state, the output voltage VH of the preceding-stage power supply circuit of the power supply unit 110 is applied to the signal generation unit 160, and when the switching circuit 150 is in an off state, the application of the output voltage VH to the signal generation unit 160 is stopped.

The signal generation unit 160 generates the above-described on/off signal to be supplied to the switching circuit 150 on the basis of the output voltages VH and VL. This on/off signal is supplied to the switching circuit 150. Furthermore, the signal generation unit 160 includes a constant current source output circuit, an oscillator, a frequency divider, and the like, and generates a control signal for generating a removal signal on the basis of the voltages VH and VL. This control signal has a sawtooth waveform and becomes a gate current output to a gate of the pulse driver 170.

Here, the signal generation unit 160 operates the removal signal finally supplied to the electrode of the lead-acid battery under, for example, the following conditions so as to be a sawtooth pulse signal having a peak value of 550 mA to 750 mA, a pulse width of 5 nsec to 100 nsec, and a frequency of 5 kHz to 50 KHz.

That is, the output voltage VH of the preceding-stage power supply circuit of the power supply unit 110 is about 9.0 V to 11.0 V (for example, 10.0 V), the output voltage VL of the subsequent-stage power supply circuit is about 5.0 V to 6.0 V (for example, 5.5 V), an oscillating frequency of the oscillator of the signal generation unit 160 is about 1.0 MHz to 5.0 MHz (for example, about 2.5 MHz), the frequency divider is configured by, for example, a divide-by-2 frequency divider and a synchronous divide-by-62 frequency divider, a frequency is set to about 0.6 MHz to 2.5 MHz (for example, about 1.25 MHZ) by the former, and a frequency is set to about 9.67 kHz to 40.32 kHz (for example, about 20.16 kHz) by the latter. As a result, a voltage of the lead-acid battery can generate a pulse signal having a pulse width of about 5 nsec to 100 nsec depending on a frequency after frequency division.

When this pulse signal is supplied to a constant current source output circuit including a PMOS transistor and a switch including an NMOS to which the voltages VH and VL are supplied, a control signal having a sawtooth waveform having a peak value of about 550 mA to 750 mA, a pulse width of about 5 nsec to 100 nsec, and a frequency of about 5 kHz to 50 kHz can be generated.

The pulse driver 170 generates a removal signal in accordance with a control signal output from the signal generation unit 160. The pulse driver 170 can be achieved by, for example, a transistor such as an FET. In this configuration, theoretically, the removal signal has the same pulse width and the same frequency as those of the control signal. This removal signal is supplied to the lead-acid battery through the substrate positive electrode terminal 110A and the substrate negative electrode terminal 100B, and a lead sulfate film of the lead-acid battery negative electrode can be removed.

FIG. 2 is a diagram showing measurement results of a current value and a voltage value measured in a state where the substrate positive electrode terminal 100A and the substrate negative electrode terminal 100B shown in FIG. 1 are connected to the lead-acid battery positive electrode terminal and the lead-acid battery negative electrode terminal of the lead-acid battery through a general-purpose connection line made of brass having a length of 60 cm and a line width of 1.4 mm. Therefore, each measurement result also includes an influence of an impedance of the connection line. In addition, all the measurement results illustrated in FIG. 2 indicate an average value of 10 measurement results.

Each measurement result illustrated in FIG. 2 is defined as follows. A "lead-acid battery voltage value" is a voltage value between the lead-acid battery positive electrode terminal and the lead-acid battery negative electrode terminal. A "peak current value" is a current value flowing from the lead-acid battery positive electrode terminal to the lead-acid battery negative electrode terminal via the lead sulfate film removing apparatus 10.

The measurement result illustrated on the upper side of FIG. 2 is obtained by measuring two 12 V lead-acid batteries A and B. The measurement result illustrated on the lower side of FIG. 2 is obtained by measuring two 24 V lead-acid batteries C and D.

In both the measurement results shown in FIG. 2 and the measurement results shown in FIG. 3 to be described later, when various measurements are performed, the lead-acid battery immediately after completion of charging is targeted, conditions such as ambient environmental temperature are substantially the same, and factors affecting the measurement results are eliminated as much as possible. In addition, as a specification of each element of the lead sulfate film removing apparatus 10, the values exemplified in parentheses in the description using FIG. 1 are adopted. That is, taking the drive resistor 120 as an example, a value of about 15Ω is adopted.

As the measurement results of the lead-acid battery A, the "lead-acid battery voltage value" was 12.9 V, and the "peak current value" was 570 mA. As the measurement results of the lead-acid battery B, the "lead-acid battery voltage value" was 13.9 V, and the "peak current value" was 600 mA. As the measurement results of the lead-acid battery C, the "lead-acid battery voltage value" was 25.8 V, and the "peak current value" was 610 mA. As the measurement results of the lead-acid battery D, the "lead-acid battery voltage value" was 27.8 V, and the "peak current value" was 660 mA.

According to the measurement result illustrated in FIG. 2, it can be seen that the peak current is 570 mA to 660 mA by using an element having the specification described with reference to FIG. 1. It is obvious to those skilled in the art that the peak current value can be easily controlled by changing the resistance value of either the drive resistor 120 or the voltage dividing resistors 130 and 140.

The present inventors verified the peak current in the range of 550 mA to 750 mA. As a result, the removal amount of the lead sulfate film exceeded the amount of the lead sulfate film generated on the lead-acid battery negative electrode terminal, and the lead sulfate film could be effectively removed whereas no damage was found in the lead-acid battery electrode.

It is obvious to those skilled in the art that a pulse width and a frequency of a pulse signal can be easily controlled by appropriately changing the specifications of the constant current source output circuit, the oscillator, the frequency divider, and the like in the signal generation unit 160. In a case where the conditions of the frequency and the peak value are set to the above range and the pulse width is set to 5 nsec to 100 nsec, even in a case where the conditions of the peak value and the pulse width are set to the above range and the frequency is set to 5 kHz to 50 kHz, the removal amount of the lead sulfate film exceeded the amount of the lead sulfate film generated on the lead-acid battery negative electrode terminal, and the lead sulfate film could be effectively removed whereas no damage was found in the lead-acid battery electrode.

FIG. 3 is a diagram showing measurement results of lead-acid battery voltage values and the like before and after recovery by the lead sulfate film removing apparatus 10 for a lead-acid battery mounted on a vehicle or the like. This voltage value was measured in the vicinity of the lead-acid battery positive electrode terminal and the lead-acid battery negative electrode terminal, and the lead sulfate film removing apparatus 10 used an element having the specifications described with reference to FIG. 1.

In addition, measurement items may be different depending on the type of vehicle or the like to which the lead sulfate film removing apparatus 10 is mounted (for example, a measurement result of the "specific gravity value" may be indicated, or an internal resistance value may be indicated). This is because the measurement item that can be evaluated for an effect of removing the lead sulfate film varies depending on a measurement target, or it is difficult to obtain a measurement result of a specific measurement item for the measurement target in the first place.

First, lead-acid batteries mounted on two forklifts a and b will be described. These forklifts a and b are equipped with 24 2 V lead-acid batteries, and the measurement results indicate an average of the measurement values of the respective measurement results for the 24 lead-acid batteries.

The specific gravity values of the forklifts a and b are measured by sucking the electrolyte solution with a pycnometer. The specific gravity value increases due to charging and decreases due to discharging, but about 1.25 to 1.30 is regarded as one indicator, and the specific gravity value decreases as an adhered amount of lead sulfate to the lead-acid battery electrode increases.

A specific gravity value deviation of the forklifts a and b is a value obtained by subtracting a minimum value from a maximum value of the specific gravity value of the electrolyte solution. Therefore, the smaller this value, the smaller a variation in the specific gravity value among the lead-acid batteries, and the better a state of the lead-acid batteries. The specific gravity value deviation of about 0.04 is defined as one indicator.

First, a measurement result of the forklift a will be considered. The voltage value was 2.16 V before recovery, but was 2.14 V after recovery, and no significant change was observed. The specific gravity value was 1.01 before recovery, but was 1.31 after recovery, indicating that the specific gravity value was greatly improved. The specific gravity value deviation was 1.25 before recovery, but was 0.02 after recovery, indicating that the variation was reduced.

Next, a measurement result of the forklift b will be considered. The voltage value was 2.14 V before recovery, but was 2.14 V after recovery, and no change was observed. The specific gravity value was 1.30 before recovery, but was 1.29 after recovery, and no substantial change was observed. The specific gravity value deviation was 0.03 before recovery, but was 0.01 after recovery, indicating that the variation was reduced.

To summarize the consideration results, according to the measurement results of the forklift a, the specific gravity value was significantly improved, and the deviation thereof was also improved. Therefore, it can be said that the effect of removing the lead sulfate film by using the lead sulfate film removing apparatus 10 is enormous. Meanwhile, according to the measurement results of the forklift b, a slight removal effect is recognized, in other words, it is presumed that lead sulfate is not much adhered to the lead-acid battery negative electrode of the forklift b.

Next, lead-acid batteries mounted on the two golf carts c and d will be described. These golf carts c and d are equipped with six 12 V lead-acid batteries, and the measurement results indicate an average of the measurement values of the respective measurement results for the six lead-acid batteries.

The internal resistance values of the golf carts c and d are measured based on a voltage drop between an open voltage and a load resistance of the lead-acid battery. The internal resistance value increases as a use period of the lead-acid battery becomes longer, and a capacity of the lead-acid battery decreases in proportion to the use period of the lead-acid battery. Regarding the internal resistance value, there is no absolute value that becomes the indicator, and the effect of removing the lead sulfate film can be evaluated depending on a relative magnitude of the value.

Each of the resistance differences of the golf carts c and d is a value obtained by subtracting a minimum value from a maximum value of the internal resistance value of the lead-acid battery. Therefore, the smaller this value, the smaller a variation in the resistance difference among the lead-acid batteries, and the better the state of the lead-acid batteries.

First, a measurement result of the golf cart c will be considered. The voltage value was 12.65 V before recovery, but was 12.51 V after recovery, and no significant change was observed. The internal resistance value was 12.50 before recovery, but was 6.14 after recovery, indicating that the internal resistance value was greatly improved. The resistance difference was 10.76 mΩ before the recovery, but was 0.69 mΩ after the recovery, indicating that the variation was reduced.

Next, a measurement result of the golf cart d will be considered. The voltage value was 11.85 V before recovery, but was 12.72 V after recovery, and slight improvement was observed. The internal resistance value was 8.78 mΩ before recovery, but was 6.10 mΩ after recovery, indicating that the internal resistance value was improved. The resistance difference was 1.47 mΩ before recovery, but was 1.35 mΩ after recovery, indicating that the variation was somewhat reduced.

To summarize the consideration results, according to the measurement results of the golf cart c, the internal resistance value was significantly improved and the resistance difference was also improved. Therefore, it can be said that the effect of removing the lead sulfate film by using the lead sulfate film removing apparatus 10 is enormous. Meanwhile, according to the measurement results of the golf cart d, a slight removal effect is recognized, but in other words, it is presumed that lead sulfate is not much adhered to the lead-acid battery negative electrode of the golf cart d.

Next, open type lead-acid batteries mounted on two automobiles e and f will be described. These automobiles are equipped with one 12 V lead-acid battery, and for this reason, the measurement results describe measurement values of the lead-acid batteries themselves instead of the "average" of the measurement values of the plurality of lead-acid batteries described so far.

A cold cranking ampere (CCA) value of the automobiles e and f is a performance reference value indicating an ability of the lead-acid battery to start an engine. Since the reference value of the CCA value varies depending on the manufacturer, type, and the like of the lead-acid battery, there is no absolute value that becomes the indicator, and the effect of removing the lead sulfate film can be evaluated depending on a relative magnitude of the value.

The internal resistance values of the automobiles e and f are the same as those described for the golf carts c and d.

Therefore, as the internal resistance value is a relatively small, it can be evaluated that the effect of removing the lead sulfate film is higher.

First, a measurement result of the automobile e will be considered. The voltage value was 12.61 V before recovery, but was 12.72 V after recovery, and no significant change was observed. The CCA value was 171 before recovery, but was 297 after recovery, indicating that the CCA value was greatly improved. The internal resistance value was 14.35 mΩ before recovery, but was 8.28 mΩ after recovery, indicating that the internal resistance value was greatly improved.

A measurement result of the automobile f will be considered. The voltage value was 12.19 V before recovery, but was 12.39 V after recovery, and no significant change was observed. The CCA value was 402 before recovery, but was 458 after recovery, indicating that the CCA value was improved. The internal resistance value was 7.65 mΩ before recovery, but was 6.32 mΩ after recovery, indicating that the internal resistance value was improved.

To summarize the consideration results, according to the measurement results of the automobile e, the CCA value and the internal resistance value are significantly improved, and it can be said that the effect of removing the lead sulfate film by using the lead sulfate film removing apparatus 10 is enormous. Meanwhile, according to the measurement results of the automobile f, a large removal effect is recognized, but from a viewpoint of a relationship with the automobile e, it is presumed that lead sulfate is not much adhered to the lead-acid battery negative electrode of the automobile f.

Next, sealed lead-acid batteries mounted on the two disaster prevention radios g and h will be described. In these disaster prevention radios g and h are equipped with one 12 V lead-acid battery as in the case of the automobiles e and f, and thus the measurement values of the lead-acid batteries themselves are described instead of the average of the measurement values of the plurality of lead-acid batteries.

The internal resistance values of the disaster prevention radios g and h are the same as those described for the golf carts c and d. Therefore, as the internal resistance value is a relatively small, it can be evaluated that the effect of removing the lead sulfate film is higher.

A measurement result of the disaster prevention radio g will be considered. The voltage value was 13.46 V before recovery, but was 13.44 V after recovery, and no significant change was observed. The internal resistance value was 9.26 mΩ before recovery, but was 8.54 mΩ after recovery, indicating that the internal resistance value was improved. A nominal value of the internal resistance value of the disaster prevention radio g was 8.55 mΩ, and the internal resistance value was recovered to a new state.

A measurement result of the disaster prevention radio h will be considered. The voltage value was 13.56 V before recovery, but was 13.47 V after recovery, and no significant change was observed. The internal resistance value was 9.31 mΩ before recovery, but was 8.55 mΩ after recovery, indicating that the internal resistance value was improved. A nominal value of the internal resistance value of the disaster prevention radio g was 8.55 mΩ, and the internal resistance value was recovered to a new state.

To summarize the consideration results, according to the measurement results of the disaster prevention radios g and h, the internal resistance value is improved in both cases, and it can be said that the effect of removing the lead sulfate film by using the lead sulfate film removing apparatus 10 is large.

The lead sulfate film removing apparatus 10 described above can be a lead sulfate film removing system including a measurement device that performs measurement indicating performance of a lead-acid battery to which the lead sulfate film removing apparatus 10 is connected, and a transmission device that transmits a measurement result measured by the measurement device.

Typical examples of the measurement target indicating performance of the lead-acid battery measured by the measurement device include the lead-acid battery voltage and the peak current shown in FIG. 2 and the internal resistance value shown in FIG. 3. Furthermore, since the internal resistance value is easily affected by a temperature, an ambient temperature can also be included so that evaluation in consideration of the temperature can be performed. Therefore, the measurement device may include a sensor or the like that measures some of these.

There are several possible transmission destinations of the measurement result transmitted by the transmission device, such as an administrator of an electric apparatus equipped with a lead-acid battery and/or an administrator of the lead sulfate film removing system of the present embodiment. In addition, the measurement result may be directly transmitted to these persons, or may be transmitted once to a cloud server that is not illustrated and then indirectly transmitted from the cloud server to these persons. As a transmission technique, a communication standard such as low power wide area (LPWA) is used, a wireless or optical fiber is used as a transmission medium, and a transmission frequency is once every month, for example. However, the transmission technique is not limited thereto.

According to the lead sulfate film removing system of the present embodiment, in addition to removing a lead sulfate film generated in a lead-acid battery of a communication base station used in a mountain area or the like, for example, an administrator in a remote location can obtain a measurement result serving as a determination material for an indication of replacement of a lead-acid battery.

As described above, in the present embodiment, the case of removing the lead sulfate film adhered to the lead-acid battery negative electrode has been described as an example, but some lead-acid batteries include a plurality of cells, and in that case, it is also possible to remove the lead sulfate film adhered to the negative electrode of each of the cells.

What is claimed is:

1. A lead sulfate film removing apparatus for removing a lead sulfate film generated on an electrode of a lead-acid battery, the apparatus comprising:

a generation unit that generates a removal signal of the lead sulfate film having a peak value of 550 mA to 750 mA, a pulse width of 5 nsec to 100 nsec, and a frequency of 5 kHz to 50 kHz, based on a signal extracted from the lead-acid battery; and a supply unit that supplies the removal signal generated by the generation unit to the electrode of the lead-acid battery.

2. A lead sulfate film removing method for removing a lead sulfate film generated on an electrode of a lead-acid battery, the method comprising:

a step of generating a removal signal of the lead sulfate film having a peak value of 550 mA to 750 mA, a pulse width of 5 nsec to 100 nsec, and a frequency of 5 kHz to 50 kHz, based on a signal extracted from the lead-acid battery; and a step of supplying the generated removal signal to the electrode of the lead-acid battery.

3. A lead sulfate film removing system comprising:

the lead sulfate film removing apparatus according to claim 1;

a measurement device that performs measurement indicating performance of a lead-acid battery to which the lead sulfate film removing apparatus is connected; and a transmission device that transmits a measurement result measured by the measurement device.

* * * * *